United States Patent [19]
Kaposi et al.

[11] Patent Number: 6,135,375
[45] Date of Patent: Oct. 24, 2000

[54] PYRAMIDAL FOOD GRATER

[75] Inventors: Sascha Kaposi; Lance L. Hood, both of Seattle; Betty Baugh, Kirkland, all of Wash.

[73] Assignee: Progressive International Corp., Kent, Wash.

[21] Appl. No.: 09/054,851

[22] Filed: Apr. 3, 1998

[51] Int. Cl.[7] .................................................. A47J 43/00
[52] U.S. Cl. ........................................... 241/95; 241/273.1
[58] Field of Search ........................ 241/DIG. 30, 273.1, 241/273.2, 95, 273.3, 273.4

[56] References Cited

U.S. PATENT DOCUMENTS

| | | |
|---|---|---|
| D. 259,759 | 7/1981 | Williams . |
| 2,482,180 | 9/1949 | Heard . |
| 2,505,114 | 4/1950 | Hayman et al. ............................ 241/95 |
| 3,583,455 | 6/1971 | Ostrowsky ................................. 241/95 |

FOREIGN PATENT DOCUMENTS

| | | |
|---|---|---|
| 871808 | 7/1987 | Greece . |
| 178171 | 7/1935 | Switzerland ............................. 241/95 |
| 2048023 | 10/1995 | United Kingdom . |

*Primary Examiner*—Mark Rosenbaum
*Attorney, Agent, or Firm*—John R. Benefiel

[57] ABSTRACT

A food grater having converging faces forming a truncated pyramidal grater body to which is mounted a ball grip at the apex. Molded non-skid foot are on each of the bottom corners such that the grater may be held erect with the palm of one hand as grating is carried out on a food item held in the other hand.

8 Claims, 2 Drawing Sheets

PYRAMIDAL FOOD GRATER

BACKGROUND OF THE INVENTION

This invention concerns food graters of the type including planar faces each having an array of perforations and a protruding cutting feature associated with each perforation, typically arranged in various patterns or array. As the food item is repeatedly drawn across the cutting features, the food item is grated by engagement with the cutting features, the grated food passing through the perforations.

Commonly, several planer faces are joined together along common sides to form a box-like structure, each face having cutting features and perforations of a different size from the other faces to provide variations in the coarseness or fineness of the grated food. A looped handle at the top allows the grater to be held while being used.

This design is somewhat clumsy in appearance, and to also use, as the fingers must be inserted into a relatively small opening in order to grip the handle. The box shape blocks easy viewing of the other faces of the grater to locate a grating pattern of a desired size.

It is the object of the present invention to provide a food it grater of the general type described but which is more easily and effectively used, and has a more trim, pleasing appearance.

SUMMARY OF THE INVENTION

The above object and others which will be understood upon a reading of the specification and claims are achieved joining together by a series of planar grater faces along common sides which converge towards each other to form a truncated pyramidal grater body with a narrow top.

Each grater face is perforated and carries a cutting feature array of a different size from the other pieces.

A ball grip having a rounded shape is mounted at the truncated top occupying the truncated apex thereof and a series of non-slip feet are secured at the bottom corners formed by jointed grater face sides.

The grater thus can readily be held in position during use by grasping the ball grip at the top, as in the palm of one hand, pressing the feet into engagement with a supporting surface. Grating is carried out with the other hand grasping the food item to be grated.

The downward pressure exerted with the one hand easily resists sideways tipping movement of the grater body despite vigorous stroking of the food item pressed against the cutting features.

There are preferably three or four convergent faces forming the pyramidally configured grater, providing a graceful appearance for this typically merely utilitarian kitchen utensil, which thus can be stored standing erect on the non-slip feet.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
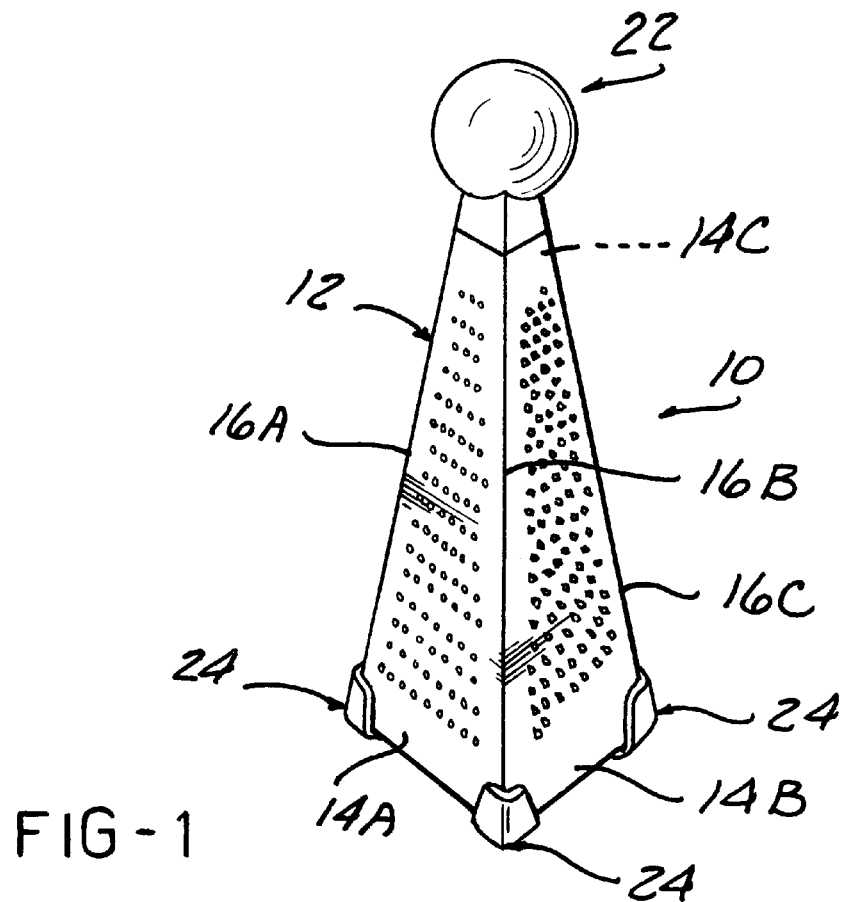
FIG. 1 is a perspective view of the kitchen grater according to the present invention.
Figure 2:
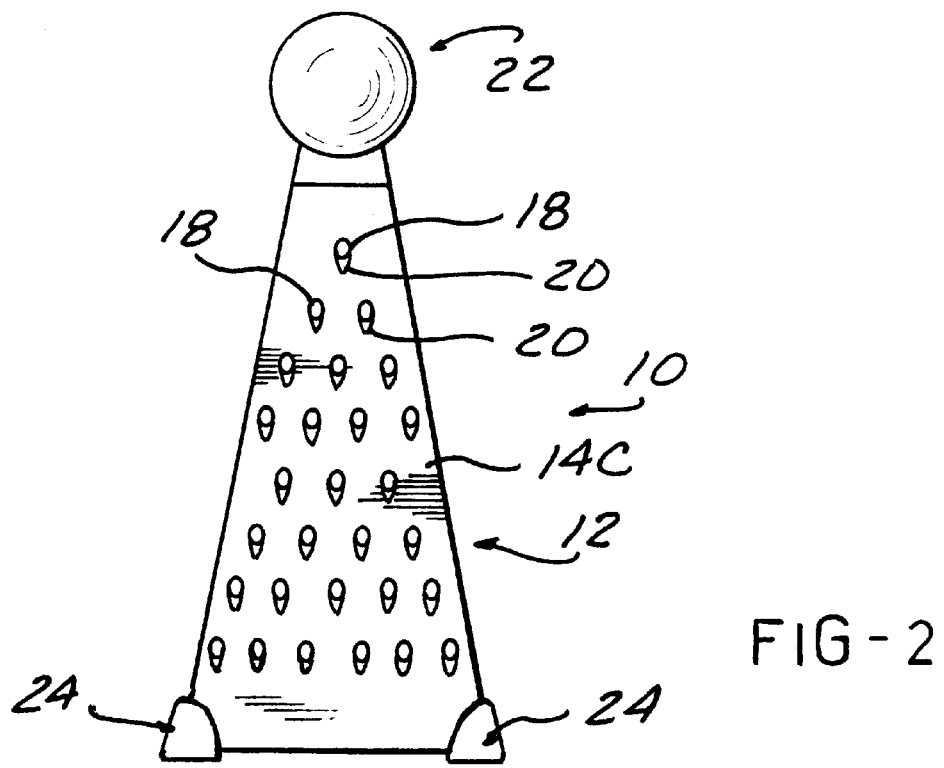
FIG. 2 is an enlarged elevational view of the kitchen grater shown in FIG. 1.

Referring to FIG. 1, the kitchen grater 10 according to the present invention comprises a grater body 12 formed by a plurality of planar grater faces 14A, 14B and 14C joined along common sides 16A, 16B, 16C to form the grater body 12. The grater body 12 may be constructed of a single piece of stainless or plated steel folded to form the common sides 16A-C and faces 14A-C. The seam 17 (FIG. 4) can be welded.

Each planar face 14A-C has convergent sides such that the truncated pyramidal shape of the grater body 12 is established.

Each face 14A-C has an array of conventional perforations 18 and adjacent cutting features 20, which may be of different sizes on each respective face as shown.

A knob shaped ball grip 22 having a rounded shape is fitted to the truncated apex of the grater body 12, while each of a series of non-slip feet 24 are fit into a respective bottom corner of the grater body 12.

The ball grip 22 and feet 24 may be constructed of a soft molded elastomeric plastic such as SANTOPRENE™.

Figure 3:
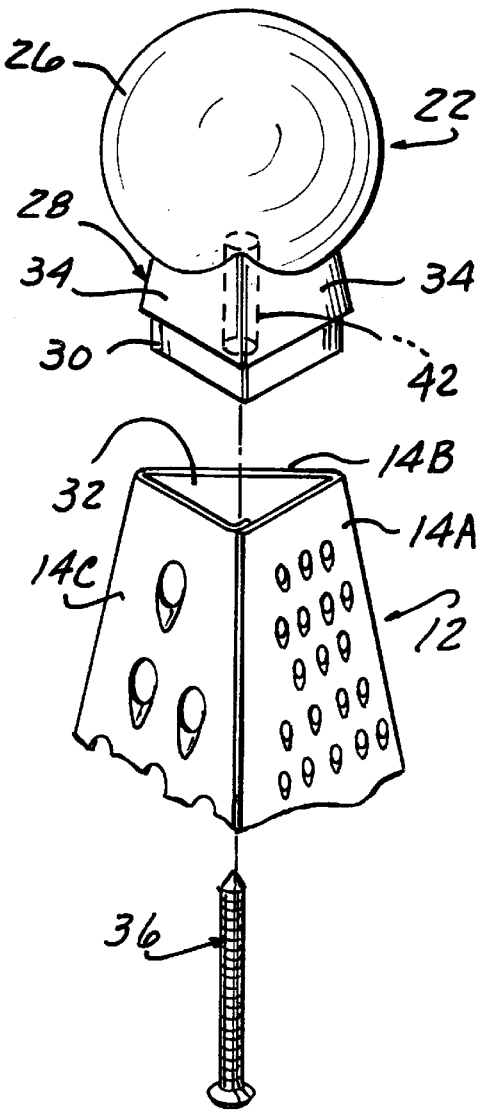
FIG. 3 is an exploded perspective view of the trapper part of the grater body and ball grip with a mounting screw.
Figure 4:
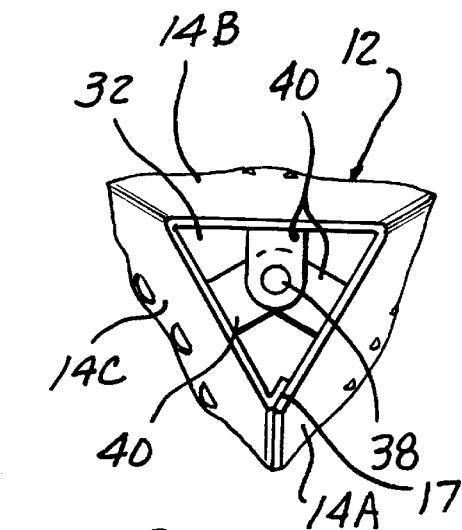
FIG. 4 is a plan view of the grater top portion showing convergent mounting tabs used to hold the ball grip to the grater body.
Figure 5:
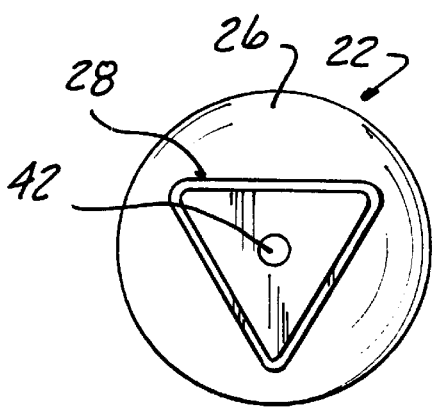
FIG. 5 is a bottom view of the ball grip.

FIGS. 3–5 shown details of the ball grip 22 and its installation.

The ball grip 22 includes a spherical upper ball portions 26 molded to a three sided base portion 28, including a reduced size section 30 sized to be fit into the triangular space of the apex of the truncated grater body 12, the ball grip occupying the area of the truncated apex. The outer surfaces 34 are flush with faces 14A–C.

As noted, the grip 22 is of a size and shape able to be received in the palm of the user's hand when being gripped as the grater 10 is in use.

A screw 36 extends through aligned holes 38 in three mounting tabs 40 (FIG. 4) welded to the inside of each face 14A–C and into a hole 4 extended up through the base 28 and into the ball portion 26 to firmly hold the ball grip 22 in position on the apex of the grater body 12.

Figure 6:
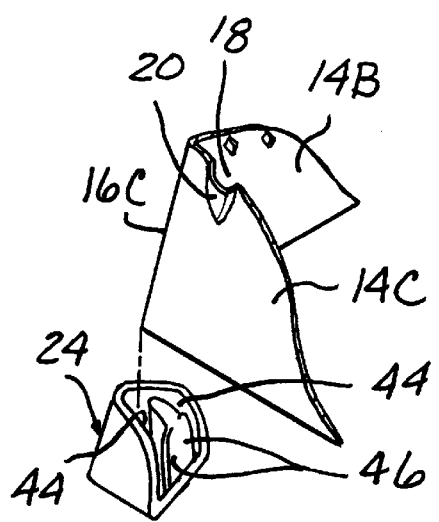
FIG. 6 is an exploded perspective view of a bottom cover portion of the grater body with a separated molded foot element.

FIG. 6 shows a representative molded foot piece 24 having grooves 44 meeting at an angle such as to receive the bottom corner formed by joined faces 14B, 14C and be frictionally retained by thin webs 46 projecting into the grooves 44.

The grater 10 thus can conveniently be securely held upright resting on the feet 24 with the palm of one hand on the ball grip 20. The feet 24 have a high friction coefficiency such as to resist sideways movement of the bottom of the grater body 12 as grating of a food item held in the other hand is carried out.

Each face 14A–C is positioned to be easily observed to quickly locate a desired grating pattern.

The grater 10 has a handsome, attractive slender tower-like appearance, and can be stored in an erect upright position on the shelf.

What is claimed is:

1. A food grater comprised of a grater body formed by a plurality of faces joined along common sides, each face formed with an array of perforations and adjacent cutting features; said faces having convergent sides such that said grater body forms a truncated pyramid; and, a a knob shaped grip occupying the truncated apex of said pyramid, said grip of a rounded shape and of a size able to be received in the palm of a user's hand when being gripped by a user.

2. The food grater according to claim 1 wherein said grater body has bottom corners formed by adjacent common sides of said grater faces at the bottom of said grater body, and further including a non-skid foot mounted to respective bottom corners.

3. The food grater according to claim 1 wherein three grater faces are provided by said grater body.

4. The food grater according to claim 1 wherein different sized perforations and cutting features are provided on respective grater faces.

5. The food grater according to claim 1 wherein said grip and each corner foot is of a soft molded elastomeric material.

6. The food grater according to claim 1 wherein said grip includes a base portion fit into an opening formed by the top side of said faces.

7. The food grater according to claim 1 wherein said grip is formed in a ball shape of a diameter able to be held in the palm of a user's hand when being gripped by a user.

8. The food grater according to claim 1 wherein said grater body has a slender tower-like shape.

\* \* \* \* \*